3,225,121
THERMOPLASTIC COPOLYMER OF VINYL
MONOMER AND ALDEHYDE MONOMER
William P. Baker, Jr., Chadds Ford, Pa., assignor to E. I.
du Pont de Nemours and Company, Wilmington, Del.,
a corporation of Delaware
No Drawing. Filed May 16, 1962, Ser. No. 195,327
11 Claims. (Cl. 260—874)

This invention relates to novel polymers and, more particularly, to block copolymers of aldehyde monomers with vinyl monomers, preferably with vinyl monomers having conjugated unsaturation, e.g. styrene, butadiene, acrylonitrile and the like.

By "aldehyde monomers" are meant those aldehydes that are free of active hydrogen. They are characterized by the formula:

wherein R is hydrogen, aryl, substituted aryl or alkyl wherein the carbon of the alkyl group attached to the carbon of the carbonyl group does not have hydrogen atoms directly attached thereto. Such compounds include formaldehyde, benzaldehyde, trimethylacetaldehyde, etc.

It has been found that by incorporating aldehyde monomers into such polymers as polystyrene and the like so that the combination is in the form of a block copolymer, a great number of the properties of the basic polymer can be substantially improved. Thus, where polystyrene is brittle and inflexible, the block copolymer of styrene and aldehyde monomer is tough and flexible. It has also been found that the novel block copolymers of the present invention are more easily cured by conventional curing treatments. Besides greater flexibility and toughness, these polymers display improved tear strengths, impact strengths and tensile strengths.

The novel block copolymers are produced by first preparing a catalyst solution; adding the solution to a purified vessel; adding, preferably, if possible, by vacuum distillation, at least one prepurified vinyl monomer under such conditions that cause the vinyl monomer to polymerize; and, thereafter, adding the aldehyde monomer under such conditions that cause copolymerization of the aldehyde monomer with the polymer of the vinyl monomer, preferably to the extent that the aldehyde monomer represents 2–80 mole percent of the sum of moles of vinyl monomer and aldehyde monomer in the final copolymer.

VINYL MONOMERS

The preferred group of vinyl monomers for use in the present invention includes styrene, butadiene, isoprene, methyl methacrylate and acrylonitrile. However, the broad group includes esters of acrylic, methacrylic and other α-substituted acrylic acids, including esters of α-cyanoacrylic acid, acrylonitrile, methacrylonitrile and other α-substituted acrylonitriles, including vinylidene cyanide, styrene, ring-substituted styrenes, α-methylstyrene, ring-substituted α-methylstyrenes, vinyl pyridines and methylene malonates.

In general, these monomers should be free of such groups as hydroxy, hydroxycarbonyl, thiol, imino, primary or secondary amino, amido and the like, i.e. free of groups that contain an active hydrogen atom as determined by the Zerewitinoff test [1] carried out under the conditions employed for polymerization. The list of compounds includes, specifically, α-methylstyrene, p-methoxy-α-methylstyrene, p-methyl-α-methylstyrene, styrene, p-methylstyrene, p-chlorostyrene, 2,4-dimethylstyrene, m-ethylstyrene, m-isopropenylstyrene, or butadiene, isoprene, piperylene, or methyl, ethyl, propyl, isopropyl, butyl, isobutyl, sec-butyl, tert-butyl, amyl, 2-ethylhexyl, octyl, capryl, nonyl, 3,5,5-trimethylhexyl, dodecyl, hexadecyl, octadecyl, cyclohexyl, methylcyclohexyl, trimethylcyclohexyl, phenyl, methallyl, crotyl, butenyl, undecenyl, oleyl, methoxyethyl, ethylthioethyl, butoxyethyl, ethoxyethoxyethyl, phenoxyethyl, benzoxyethyl, cyclohexoxyethyl, butoxypropyl, ethoxybutyl, terphenyl, phenylethyl, hexahydrobenzyl, tetrahydrobenzyl, tetrahydrofurfuryl, dicyclopentyl, dicyclopentenyl, methacrylate or acrylate, or 2-, 3-, or 4-vinylpyridine, or acrylonitrile, methacrylonitrile, α-phenylacrylonitrile, or dimethyl methylenemalonate, diethyl methylenemalonate, vinylidene cyanide, or methyl, ethyl, or butyl α-cyanoacrylate.

SOLVENTS

Various solvents can be employed for the polymerizations. They include benzene, toluene, xylene, the napthas, ethers, such as diethyl ether, diisopropyl ether, dioxane, tetrahydrofurane, the dimethyl ether of ethylene glycol, dimethylformamide and dimethylacetamide. The important considerations in selecting the solvents are: they should be inert; they should have some affinity for the polymer formed; and they should not contain in their structure any active hydrogen atoms as determined by the Zerewitinoff test carried out under the conditions employed for polymerization, or other groups which would have a tendency to act as chain terminating or transfer agents. That is, the same criterion regarding active hydrogen applied to the vinyl monomers should be applied to the solvents.

CATALYSTS

The catalyst systems operable in this process are broadly those which promote the formation of dicarbanions. That is, they are capable of transferring an electron to a polymerizable monomer to form a monomer ion, which adds more monomer units and then combines with another ionized monomer radical to yield a molecule having two negatively charged ends or sites (a dicarbanion) on each end of which further propagation can take place. Thus, the metals of Group IA (lithium, sodium, potassium) used either alone or as complexes with such polycyclic aromatic compounds as naphthalene, phenanthrene, diphenyl, dinaphthyl, acenaphthene, methylnaphthalene and retene are especially effective in promoting polymerizations of this type.

The amount of catalyst employed depends primarily on the monomers to be used and the characteristics desired in the final polymer produced. In general, an increased amount of catalyst leads to the production of a lower molecular weight product, and vice versa.

REACTION CONDITIONS

With respect to temperature at which these copolymerizations are carried out, temperatures as low as −100° C. and as high as 100° C. may be employed in carrying out the polymerization. Preferably, the reactions are carried out at a temperature of about −80° C. to +10° C. The precise temperature of polymerization will depend to a large degree upon the particular reactivities of the monomers being reacted. Stability of the intermediate carbanion likewise is a consideration in selecting the best temperature for carrying out the reaction. The process is usually carried out under vacuum. For some systems, it may be desired to carry out the polymerizations at atmospheric pressure or above. In some instances an inert atmosphere such as argon may be used to advantage.

---

[1] As described in two articles by Zerewitinoff: Berichte, 40, 2023 (1907) and Berichte, 41, 2233 (1908); and in an article by Kohler in J. Am. Chem. Soc., 49, 3181 (1927).

ALDEHYDE MONOMER

The aldehyde monomer is characterized by a carbonyl group which is believed to link to the vinyl monomer (styrene is shown as merely illustrative) to provide the following type of polymer:

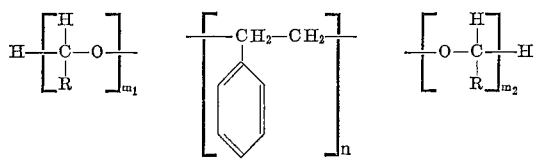

wherein R may be hydrogen, aryl or alkyl devoid of hydrogen atoms on the carbon atom attached to the carbonyl carbon atom.

The monomer should be used in a very pure condition and should be added to the polymerization system after polymerization of the vinyl monomer has occurred to the extent of at least 10 units as represented by "$n$" in the typical formulae. The amount of aldehyde monomer used should be such that it represents at least 0.5 mole percent of total monomer in the copolymer as represented by "$m_1$" and "$m_2$" in the typical formulae. Below this amount, it has been found that the advantages of the present invention are not achieved. It should be understood that different minima will apply depending upon the vinyl monomer or vinyl monomers used. Although there is no real maximum, it has been found that when the aldehyde monomer represents more than 80 mole percent of total monomer used, then the basic desirable properties of the polymer of the vinyl monomer are substantially lost. In some instances wherein properties more characteristic of the aldehyde polymer may be most desired, a higher proportion of the aldehyde monomer, for example up to 98 mole percent, may be incorporated.

Although the preferred aldehyde monomers are formaldehyde, benzaldehyde and trimethylacetaldehyde, others may be used. The other include o-tolualdehyde; m-tolualdehyde; p-tolualdehyde; alpha-naphthaldehyde; beta-naphthaldehyde; furfural; dimethylethylacetaldehyde; diethylmethylacetaldehyde; 2,2,4-trimethylvaleraldehyde and the like.

As stated previously, the copolymer of this invention is the block copolymer. Specifically, it is the block copolymer having at least one constituent incorporated singly as a central discrete segment, said constituent being a polymerized vinyl monomer (styrene, methyl methacrylate, acrylonitrile, isoprene, butadiene), said central segment having attached at each end at least one additional polymer segment of a polymerizable monomer devoid of carbon-to-carbon unsaturation (the aldehyde monomer). It should be understood that other polymer segments, e.g. vinyl or non-vinyl, may be attached to the segments of polymerized aldehyde monomer. The block copolymers are prepared by the action of an electron transfer agent of the group of metals and metallo-organic complexes of Group IA of the Periodic Table.

It should be understood that the novel copolymers of this invention are useful in the preparation of films, filaments, rods, tubing, moldings, foamed structures, nets, non-woven fabrics and the like.

The films may be used for packaging or as laminates in the preparation of building materials or the like. The copolymers of the invention may be used as such. They may also contain dyes, fillers, pigments, plasticizers, etc.

The invention will be more fully understood by referring to the examples which follow.

*Example 1*

The apparatus for the polymerization consists of a vacuum train to which is attached the polymerization flask fitted with a glass covered magnetic stirring bar and tubes for admitting the catalyst solution, the solvent and the monomers. The equipment is so arranged that transfers of material to the reaction flask can be made through the closed system, out of contact with the exterior atmosphere. For convenience, the reaction system is operated under reduced pressure so that the liquid materials can be transferred by distillation. The catalyst solution is introduced from a dropping funnel fitted directly to the polymerization flask.

The reaction flask and stirrer are prepared for carrying out polymerization by first heating in an oven at 140° C. overnight, then flaming under evacuation for three hours, then cooling to room temperature under nitrogen and finally attaching to the vacuum line and evacuating. There is then added 3.5 ml. of catalyst solution, about 0.01 molar sodium biphenyl in prepurified tetrahydrofurane. The flask is cooled to −80° C. with a Dry Ice/acetone bath and 250 ml. of tetrahydrofurane is evaporated into it from a blue-green solution of tetrahydrofurane and sodium biphenyl maintained at room temperature. The color of the liquid in the reaction flask at this stage is blue-green (sodium biphenyl) and it shows no loss of intensity on standing, indicating that no catalyst deactivation is occurring. Following this, 7.9 ml. (7.3 grams) of styrene is added by distillation under vacuum over a 15-minute interval while the temperature is held at −80° C.

The styrene had been purified by washing with 10% sodium hydroxide and then with water, then drying over magnesium sulfate, then distilling under nitrogen onto calcium hydride, then degassing under vacuum three times. The styrene so treated is distilled under reduced pressure. A center cut is distilled onto calcium hydride and, prior to use in the polymerization, 10% of this center cut is distilled off and discarded prior to use. Immediately upon the addition of styrene, the solution, which is stirred continuously throughout the experiment by a glass encased magnetic stirrer, turns dark red. After the styrene addition, gaseous formaldehyde is introduced into the viscous red solution. The formaldehyde is generated by heating purified polymeric formaldehyde under reduced pressure. The polymeric formaldehyde is purified as described in U.S. Patent 2,841,570. The solution quickly turns from red to pink to clear while the viscosity decreases considerably.

After about 10 minutes, 5 grams of formaldehyde has been added and a film has formed on the surface of the stirred solution. Addition of more styrene (5.1 ml.) produces no red color indicating that the growing copolymer is incapable of activating the styrene. The flask is opened under nitrogen and 5 ml. of ethanol is added. The clear cold contents of the flask are decanted into 2½ liters of methanol and the precipitate is collected by filtration and dried under vacuum at room temperature.

A portion of the dried polymeric material is pressed at 170° C. and 30 tons pressure to give a clear film. The infrared spectrum of the film shows strong absorption characteristics of styrene and of formaldehyde. The polymer is completely soluble in benzene and shows an inherent viscosity (0.5 gram in 100 ml. of benzene at 30° C.) of 1.7, indicating a molecular weight of over 400,000. The yield is nearly 90% of theoretical. Repeated reprecipitation of this material from benzene produces no change in the infrared absorption spectrum, indicating that a true copolymer has been formed. Furthermore, a film from this polymeric material is tough and flexible whereas a control polystyrene film is a brittle film.

In parallel experiments carried out as described above, except that lithium biphenyl was used in place of sodium biphenyl as the catalyst, the same type of block copolymer was obtained with essentially the same characteristics as when sodium biphenyl was employed.

Attempts to polymerize styrene and formaldehyde in the presence of concentrated sulfuric acid yields a low molecular weight copolymer that cannot be cast into a film.

Example 2

Following the procedure of Example 1, there is added 1 ml. of catalyst solution (0.001 molar sodium biphenyl in tetrahydrofurane). Previously the flask has been cooled to −80° C. at which temperature it is maintained. There is no indication of catalyst deterioration after 30 minutes and 300 ml. of tetrahydrofurane is distilled into the flask under reduced pressure from a solution of sodium biphenyl in pre-purified tetrahydrofurane. Then 7.2 ml. of methyl methacrylate is added.

The solution immediately changes from blue-green to colorless and the viscosity of the solution increases with increasing addition of monomer. After the addition of methyl methacrylate has been completed, gaseous formaldehyde was admitted. The formaldehyde is generated as described in Example 1.

The addition of the formaldehyde to the viscous solution causes an apparent drop in the viscosity. Formaldehyde is passed into the solution for about 10 minutes (5 grams added) after which a second portion (6.7 ml.) of methyl methacrylate is added. Initially, with the addition of the methyl methacrylate the viscosity begins to increase until finally there is no further change in viscosity.

Following this, 1 ml. of degassed glacial acetic acid is distilled into the polymerization flask. The flask is then detached from the vacuum line and its contents are decanted into 2½ liters of heptane. The block polymer which precipitates is collected and dried. The dried polymer is pressed into a clear, flexible film at 200° C. The infrared spectra of the films shows absorption at 5.7 microns and at 8-9 and 9-10 microns, characteristic of methyl methacrylate and formaldehyde, respectively, and this does not change on reprecipitation of the product from tetrahydrofurane.

The block copolymer is pressed to form a film at a temperature above 200° C. The film is tough and has a higher melt flow temperature than a control film of polymethyl methacrylate or a control film of the random copolymer.

Furthermore, the block copolymer can be made up into 50% solids solutions in tetrahydrofurane which are of low viscosity and well adapted for coating on paper, films, and the like. The random copolymer gives a very viscous solution at a solids content of 15-20%. The block copolymer has enhanced thermal stability over the non-modified styrene or formaldehyde homopolymer or the random copolymer.

The example is repeated with sodium biphenyl being replaced by triphenylmethyl sodium. The block copolymer has the same characteristics as that made with sodium biphenyl as catalyst.

Example 3

Following the procedure outlined in Example 1, trimethylacetaldehyde was polymerized onto a central segment of polyacrylonitrile. The block copolymer product was pressed into a tough film with good tear strength and impact resistance.

Example 4

Following the procedure of Example 1, benzaldehyde was polymerized onto a central segment of polybutadiene. The block copolymer product was pressed into a tough film that was considerably stiffer than a film from polybutadiene.

Example 5

Following the procedure of Example 1, formaldehyde was polymerized onto a polymerized segment of isoprene. The block copolymer product was made up into a 50% solids dispersion in heptane and coated on a sheet of kraft paper to give an impermeable, very tough structure. A similar product made from a solution of a random copolymer shows poorer slip characteristics at elevated temperatures.

Having fully disclosed the invention, what is claimed is:

1. A normally solid thermoplastic copolymer having at least one constituent incorporated singly as a non-recurring central discrete segment, said constituent being a polmerized vinyl monomer, said central segment being composed of at least 10 units of said vinyl monomer and having attached at each end at least one additional polymer segment of an aldehyde monomer of the formula R—CH=O where R is selected from the group consisting of hydrogen, aryl and alkyl having no hydrogen atoms attached to the carbon atom connected to the carbonyl carbon, said vinyl monomer being devoid of groups containing an active hydrogen atom as determined by the Zerewitinoff test, and said aldehyde monomer constituting 0.5-98% of the sum of the moles of said copolymer.

2. A copolymer as in claim 1 wherein said vinyl monomer had conjugated unsaturation.

3. A copolymer as in claim 1 wherein said vinyl monomer is styrene.

4. A copolymer as in claim 1 wherein said vinyl monomer is butadiene.

5. A copolymer as in claim 1 wherein said vinyl monomer is isoprene.

6. A copolymer as in claim 1 wherein said vinyl monomer is methyl methacrylate.

7. A copolymer as in claim 1 wherein said vinyl monomer is acrylonitrile.

8. A copolymer as in claim 1 wherein said aldehyde monomer is formaldehyde.

9. A copolymer as in claim 1 wherein said aldehyde monomer is trimethylacetaldehyde.

10. A copolymer as in claim 1 wherein said aldehyde monomer is benzaldehyde.

11. A self-supporting film comprising a normally solid thermoplastic copolymer having at least one constituent incorporated singly as a non-recurring central discrete segment, said constituent being a polymerized vinyl monomer, said central segment being composed of at least 10 units of said vinyl monomer and having attached at each end at least one additional polymer segment of an aldehyde monomer of the formula R—CH=O where R is selected from the group consisting of hydrogen, aryl and alkyl having no hydrogen atoms attached to the carbon atom connected to the carbonyl carbon, said vinyl monomer being devoid of groups containing an active hydrogen atom as determined by the Zerewitinoff test, and said aldehyde monomer constituting 0.5-98% of the sum of the moles of said copolymer.

References Cited by the Examiner

UNITED STATES PATENTS

| 2,816,086 | 12/1957 | Harvey et al. | 260—887 |
| 3,050,511 | 8/1962 | Szwarc | 260—93.5 |

JOSEPH L. SCHOFER, *Primary Examiner.*